United States Patent
Franklin et al.

(10) Patent No.: US 9,223,349 B2
(45) Date of Patent: Dec. 29, 2015

(54) LOW-FORCE DUST SEAL

(75) Inventors: Jeremy C. Franklin, San Francisco, CA (US); Jiang Ai, Cupertino, CA (US); Amy Qian, San Jose, CA (US); Benjamin M. Rappoport, Los Gatos, CA (US); Kevin D. Gibbs, San Carlos, CA (US); Derek Wright, San Francisco, CA (US); John P. Ternus, Los Altos Hills, CA (US); John Raff, Menlo Park, CA (US); Stephen R. McClure, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 782 days.

(21) Appl. No.: 13/528,789

(22) Filed: Jun. 20, 2012

(65) Prior Publication Data
US 2013/0342970 A1 Dec. 26, 2013

(51) Int. Cl.
*G06F 1/16* (2006.01)

(52) U.S. Cl.
CPC ............ *G06F 1/1643* (2013.01); *G06F 1/1656* (2013.01); *G06F 1/1658* (2013.01); *Y10T 29/49863* (2015.01); *Y10T 29/49865* (2015.01)

(58) Field of Classification Search
CPC combination set(s) only.
See application file for complete search history.

(56) References Cited

U.S. PATENT DOCUMENTS

| | | | |
|---|---|---|---|
| 6,532,152 B1 * | 3/2003 | White et al. | 361/692 |
| 7,515,401 B2 | 4/2009 | Wikstrom et al. | |
| 7,519,350 B2 * | 4/2009 | Yamamoto et al. | 455/347 |
| 7,663,604 B2 * | 2/2010 | Maruyama et al. | 345/173 |
| 8,060,168 B2 * | 11/2011 | Horrdin et al. | 455/575.8 |
| 2007/0146612 A1 * | 6/2007 | Fujishima | 349/149 |
| 2007/0229475 A1 * | 10/2007 | Gettemy et al. | 345/173 |

* cited by examiner

*Primary Examiner* — Lisa Lea Edmonds
(74) *Attorney, Agent, or Firm* — Treyz Law Group, P.C.; G. Victor Treyz; Zachary D. Hadd

(57) ABSTRACT

An electronic device may have polarizer layers, color filter layers, thin-film-transistor layers, and other display layers. A display layer may be separated from structures such as a display cover layer formed from clear glass or plastic and a touch sensor layer mounted on an inner surface of the display cover layer by an air gap. Cavities within an electronic device housing may serve as a source of dust and other contaminants. The air gap may be sealed against dust intrusion from a cavity within an electronic device using a dust sealing structure. The dust sealing structure may have a rectangular ring shape that runs around a rectangular peripheral portion of a display layer. The dust sealing structure may be formed from a tape-based structure, an elastomeric structure, a compressible foam structure, or a cured liquid structure.

27 Claims, 21 Drawing Sheets

LOW-FORCE DUST SEAL

BACKGROUND

This relates generally to electronic devices and, more particularly, to dust sealing structures in electronic devices.

Electronic devices such as computers and cellular telephones have displays, touch sensors, housings, and other structures. It may sometimes be desirable to form dust seals between these structures. For example, it may be desirable to form a dust seal between a touch sensor array and a display module.

Conventional dust sealing structures are based on foam gaskets. A satisfactory dust seal may be created when a foam gasket is compressed between a touch sensor and a display. However, a restoring force is produced by the compressed foam gasket that may tend to push apart structures in the electronic device. Variations in the flatness of device components and the separation between components may cause variations in foam compression. These variations may in turn lead to variations in the load that is impressed on device components, giving rise to a potential for light leakage and undesired stresses.

It would therefore be desirable to be able to provide improved seals between structures in an electronic device.

SUMMARY

An electronic device may have display structures such as polarizer layers, color filter layers, thin-film-transistor layers, and other display layers. A display layer may be separated by an air gap from structures such as a display cover layer formed from clear glass or plastic and a touch sensor layer mounted on an inner surface of the display cover layer.

Cavities within an electronic device housing may serve as a source of dust and other contaminants. The air gap may be sealed against dust intrusion from the cavities using a dust sealing structure. The display layer may have a rectangular periphery. The dust sealing structure may have a rectangular ring shape that runs around the rectangular periphery of the display layer.

The dust sealing structure may be formed from a tape-based structure. The tape-based structure may have a C-shaped cross-sectional shape, an S-shaped cross-sectional shape, or may have other cross-sectional shapes.

Solid (non-foam) elastomeric materials may be used in forming dust sealing structures. An elastomeric dust sealing structure may, for example, be formed from a material such as silicone. An elastomeric dust sealing structure may have a cross-sectional shape such as a C-shape that at least partly surrounds an air cavity.

Dust sealing structures may also be formed from compressible foam members. Initially, a foam member may have a first thickness. Following compression of the foam member between a display layer and another structure such as a touch sensor layer or a display cover layer, the thickness of the foam member may be reduced to a second thickness. Processing operations such as operations involving application of heat, application of ultrasonic signals, exposure to humid environments and other environments, and other operations may be used to set the compressed foam member in its compressed state, so that the foam member retains the second thickness without exerting outward forces that might otherwise tend to disassemble device structures.

Further features of the invention, its nature and various advantages will be more apparent from the accompanying drawings and the following detailed description of the preferred embodiments.

DETAILED DESCRIPTION

Dust sealing structures may be formed from tape structures, from elastomeric members, from compressible materials such as polymer foams that are set in their compressed state, or from cured liquid materials (as examples). Dust sealing structures such as these may form low-force seals that do not tend to push apart device structures following assembly.

Low-force dust sealing structures may be used to form an environmental seal (i.e., a dust seal) between two or more adjacent structures in an electronic device. As an example, dust sealing structures may be used in forming a dust seal between a touch sensor array on a display cover glass and display structures such as liquid crystal display structures. Dust sealing structures may also be used in forming water resistant seals and other seals in an electronic device. The structures that are sealed may include housing structures, display structures, touch sensor structures, or other device structures. Illustrative configurations in which sealing structures are used to form dust seals between structures such as a touch sensor layer, a display cover layer, display layers such as polarizer layers, color filter layers, and thin-film transistor layers, housing structures, and combinations of any two or more of these structures are sometimes described herein as an example. This is, however, merely illustrative. Any suitable type of structures and, in particular, structures associated with an electronic device, may be sealed, if desired.

Figure 1:
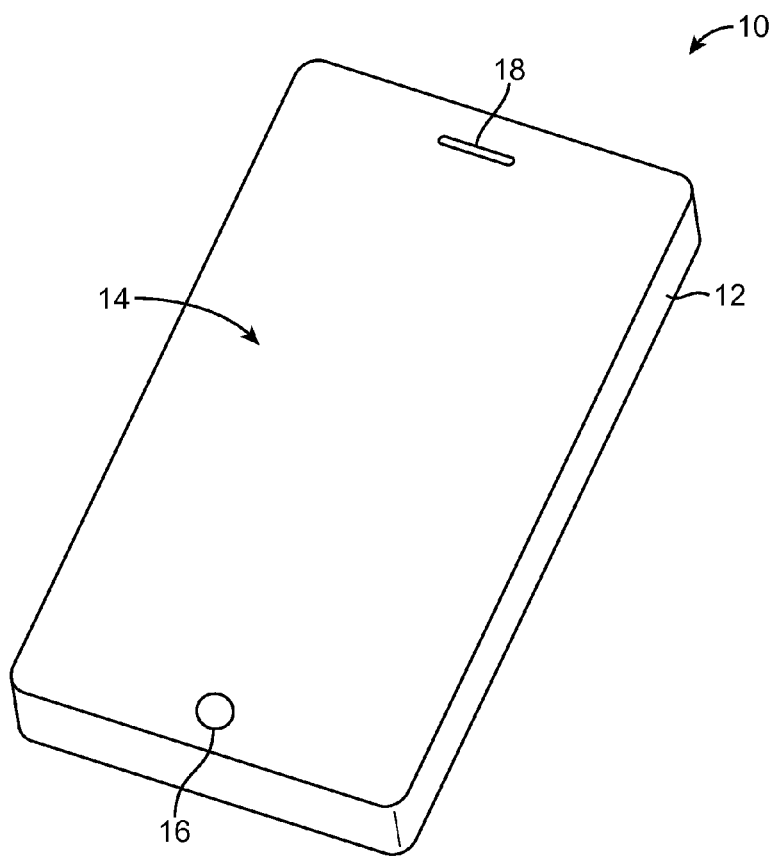
FIG. 1 is a perspective view of an illustrative electronic device with dust sealing structures in accordance with an embodiment of the present invention.

An illustrative electronic device of the type that may be provided with dust sealing structures is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a display such as display 14. Display 14 may be a touch screen that incorporates a layer of conductive capacitive touch sensor electrodes or other touch sensor components or may be a display that is not touch-sensitive. Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. Configurations in which display 14 includes display layers that form liquid crystal display (LCD) pixels may sometimes be described herein as an example. This is, however, merely illustrative. Display 14 may include display pixels formed using any suitable type of display technology.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

Device 10 may have a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.). The periphery of housing 12 may, if desired, include walls. For example, housing 12 may have a peripheral conductive member such as a metal housing sidewall member that runs around some or all of the periphery of device 10 or may have a display bezel that surrounds display 14. Housing 12 may have sidewalls that are curved, sidewalls that are planar, sidewalls that have a combination of curved and flat sections, and sidewalls of other suitable shapes. One or more openings may be formed in housing 12 to accommodate connector ports, buttons, and other components.

Figure 2:
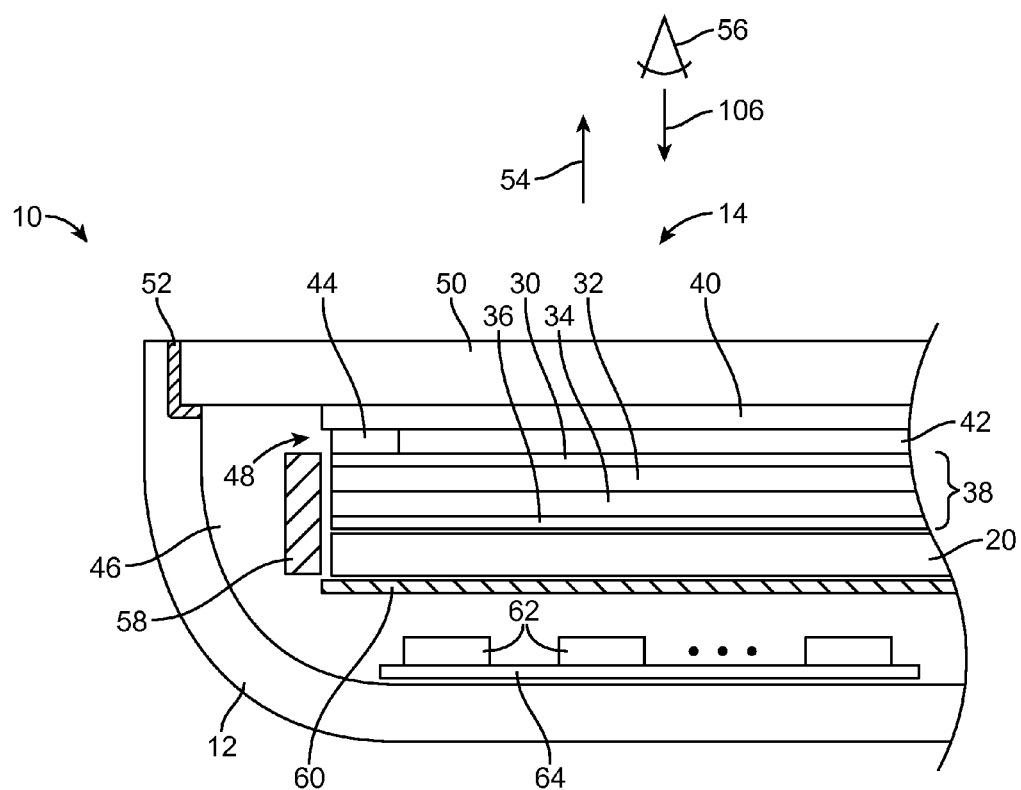
FIG. 2 is a cross-sectional side view of an illustrative electronic device with dust sealing structures in accordance with an embodiment of the present invention.

A cross-sectional side view of electronic device structures associated with display 14 is shown in FIG. 2. As shown in FIG. 2, display 14 may include display backlight structures 20, display layers (structures) 38, and an associated touch sensor array such as touch sensor layer 40. Touch sensor layer 40 (and, if desired, portions of an associated display cover layer) may be separated from display layers 38 by an air gap such as air gap 42. A sealing structure such as dust sealing structure 44 may be used to prevent dust and other environmental contaminants from entering air gap 42 in direction 48 from cavity 46 (i.e., dust sealing structure 44 may seal air gap 42 against intrusion by dust).

Touch sensor layer 40 may be formed from an array of transparent conductive capacitive touch sensor electrodes such as indium tin oxide electrodes. A display cover layer such as display cover layer 50 may be mounted in electronic device housing 12 using a gasket such as gasket 52 (e.g., an elastomeric gasket, adhesive, or other suitable structures). One or more air-filled cavities such as cavity 46 may be formed between and within housing 12, internal housing structures, and other internal structures in device 10. Cavities such as cavity 46 may serve as a potential source of dust. Using sealing structures such as dust sealing structure 44 of FIG. 2, the dust and other contaminants may be prevented from intruding into display 14 between layers such as touch sensor layer 40 and display layers 38. Sealing structures such as sealing structure 44 may also be used to form environmental seals between other structures in device 10 (e.g., between structures such as housing 12, one or more of the layers in display 14, touch sensor layer 40, display cover layer 50, etc.).

Display cover layer 50 may be formed from a layer of glass or plastic may be used to cover the surface of display 14 (e.g., the front face of device 10 of FIG. 1). The structures of touch sensor layer 40 may be formed on the cover layer or may be formed on a touch sensor substrate such as a layer of glass or plastic. For example, the touch sensor layer may be implemented as a touch sensor array that is attached to display cover layer 50 or other layers in display 14 using adhesive or other attachment mechanisms or may be implemented as a layer that is incorporated elsewhere in display 14.

Display backlight structures 20 may include a light source, a light guide plate, a reflector, and optical films. The light guide plate may be formed from a rectangular planar layer of plastic. The light source may be a light-emitting diode array or a lamp (as examples). Light that is emitted from the light-emitting diode array or lamp may be coupled into the light guide plate through the edge of the light guide plate. Light from the light source may be distributed laterally within the light guide plate throughout the display in accordance with the principal of total internal reflection. Light that scatters vertically upwards through backlight structures 20 in direction 54 may pass through display layers 38, touch sensor array layer 40, and display cover layer 50 and may serve as backlight that helps a viewer such as user 56 to view images on display 14. The reflector in backlight structures 20 may be located below the light guide plate and may be used to direct light that has escaped from the light guide plate in the downwards direction back up in upwards direction 54, thereby enhancing backlight efficiency. Optical films such as brightness enhancing films, diffusing films, and other films may be included in backlight structures 20 (e.g., above the light guide plate), if desired.

Display structures 38 may include liquid crystal display structures or structures associated with other suitable types of display. In an illustrative liquid crystal display configuration, a layer of liquid crystal material may be sandwiched between color filter layer 32 and thin-film transistor layer 34. Layer 32 may contain an array of color filter elements for providing display 14 with the ability to display color images for viewer 56. Layer 34 may contain an array of display pixels electrodes. The display pixel electrodes may be used to impose electric fields on portions of the liquid crystal layer, thereby creating an image on display 14. Thin-film transistor circuitry on layer 34 may be used to route control signals from a display driver circuit (e.g., a display driver integrated circuit) to display pixel thin-film transistors and electrodes on layer 34. Layers 32 and 34 may be sandwiched between upper polarizer layer 30 and lower polarizer layer 36.

One or more chassis structures such as chassis structures 58 may be used in forming display 14. Chassis structures 58 may include a plastic chassis structure (sometimes referred to as a p-chassis) and/or a metal chassis structure (sometimes referred to as an m-chassis). These chassis structures may be used in supporting the structures of display 14 such as backlight structures 20 and display layers 38 (as an example). Structures such as structure 38 may be mounted on a planar internal housing structure such as internal housing structure 60 (sometimes referred to as a mid-plate member or sheet metal structures). Sealing structures 44 may be used in forming a seal between structures such as cover glass 50, touch sensor layer 40, display layers 38 (e.g., upper polarizer 30, color filter layer 32, thin-film transistor layer 34, and/or lower polarizer layer 36), backlight structures 20, chassis structures 58, internal housing structures such as structures 60, housing 12, and/or other structures in device 10.

Device 10 may include internal components such as components 62. Components 62 may include integrated circuits, connectors, switches, resistors, capacitors, and inductors, and other circuit components. Components 62 may be mounted on one or more support structures such as substrate 64. Substrates such as substrate 64 may be formed from a rigid printed circuit board material (e.g., fiberglass-filled epoxy material such as FR4) or a flexible printed circuit substrate material such as polyimide or a sheet of other flexible polymer. Substrate 64 may be mounted within housing 12.

Figure 3:
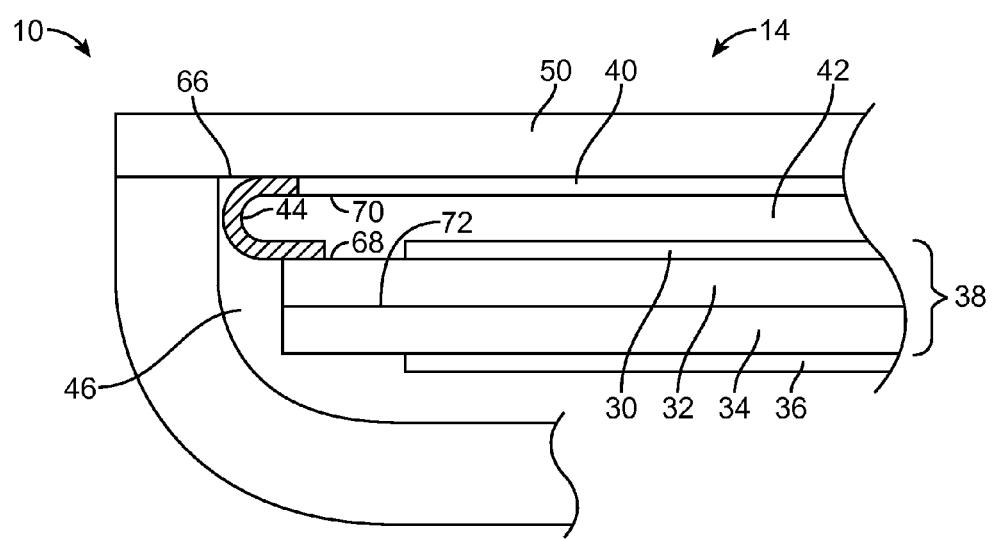
FIG. 3 is a cross-sectional side view of an electronic device with an illustrative C-shaped tape dust sealing structure in accordance with an embodiment of the present invention.

As shown in the cross-sectional diagram of FIG. 3, sealing structure 44 in device 10 may be formed from a tape-based structure having a C-shaped cross-sectional shape. Sealing structure 44 may be used to seal air gap 42 against dust (i.e., to form a dust barrier between cavity 46 and air gap 42). Structure 44 may have an elongated strip shape that extends along the edges of display 14 (i.e., into the page in the orientation of FIG. 3). In a rectangular display, there may be, for example, four strips of C-shaped tape 44, forming dust seals for each of the four air gaps around the periphery of rectangular air gap region 42.

Tape-based sealing structure 44 may be formed from a strip of fabric, a strip of plastic, a strip of flexible metal foil, strips of other materials, or combinations of these structures. Adhesive may be embedded within the tape of sealing structure 44 (e.g., within the fibers of a fabric tape) or separate layers of adhesive may be used in attaching tape sealing structure 44 to the structures of device 10 (e.g., layers of adhesive on one or both sides of a plastic or metal tape substrate).

In the example of FIG. 3, tape-based sealing structure 44 has been used to form a seal between inner surface 66 of display cover layer 50 and exposed surface 68 of color filter layer 30. This is merely illustrative. C-shaped tape sealing structure 44 of FIG. 3 may be attached between any two or more structures in device 10, if desired. As an example, the upper portion of tape 44 may be attached to inner surface 70 of touch sensor 40, whereas the lower portion of tape 44 may be attached to uppermost surface 72 of thin-film transistor layer 34. Tape 44 may be bowed outwards (as shown in the example of FIG. 3) or may be bowed inwards.

Figure 4:
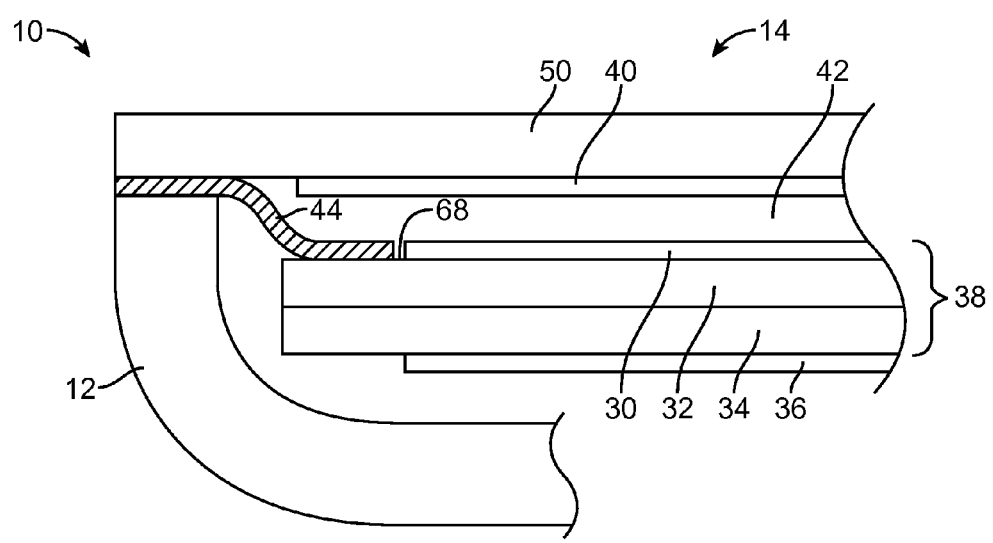
FIG. 4 is a cross-sectional side view of an electronic device with an illustrative S-shaped tape dust sealing structure in accordance with an embodiment of the present invention.

In the illustrative configuration of FIG. 4, tape-based sealing structure 44 has an S-shaped cross section. Tape-based sealing structure 44 may have one end that is attached to display cover layer 50 and housing 12 and an opposing end that is attached to surface 68 of color filter layer 32.

Figure 5:
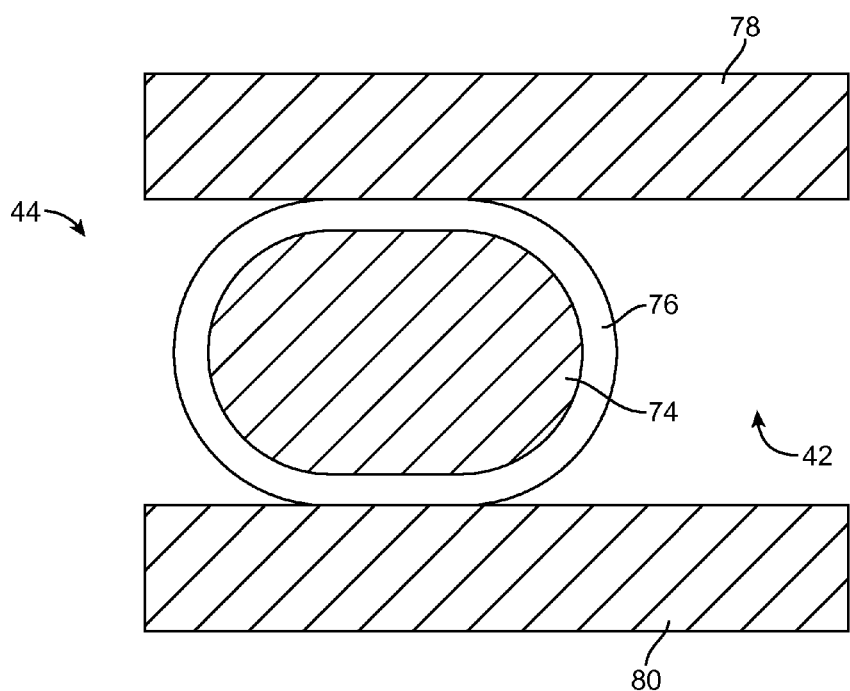
FIG. 5 is a cross-sectional side view of electronic device structures that have been sealed using a foam gasket wrapped with an O-shaped dust barrier layer in accordance with an embodiment of the present invention.

As shown in the cross-sectional end view of sealing structure 44 of FIG. 5, sealing structure 44 may be based on a compressible structure having an inner biasing structure such as biasing structure 74 and an outer environmental sealing layer such as layer 76. Sealing structure 44 may have an elongated shape (e.g., an elongated tube shape) that has a longitudinal axis that extends into the page (in the orientation of FIG. 5). Biasing structure 74 may be optimized for providing a weak outwards biasing force, so the amount of restoring force that is generated when sealing structure 44 is compressed between opposing device structures such as structures 78 and 80 is relatively small. Biasing structure 74 may be formed, as an example, from foam (e.g., a weak foam that potentially has relatively large voids), from plastic or metal fibers, or other structures that weakly press outwardly when compressed. Structures 78 and 80 may include a display cover layer, a touch sensor layer, display layers such as polarizer layers, color filter layers, thin-film transistor layers, backlight structures, housing structures such as housing walls and internal planar mid-plate structures, other structures in device 10 and combinations of these structures.

Because the materials that form biasing structure 74 are configured to provide only a relatively small amount of outwards force when compressed, the addition of one or more dust barrier layers such as layer 76 may be used to help enhance the dust sealing capabilities of sealing structure 44. Layer 76 may be formed from plastic (e.g., a sheet of a thin flexible polymer that has been wrapped fully or partly around the core structure formed from biasing structure 74), fabric, flexible metal foil, portions of foam 74 that have been locally melted and resolidified using heat and/or chemicals, or other structures that serve as dust barriers. In the example of FIG. 5, there is a single dust barrier layer surrounding biasing structure 74. If desired, two or more layers such as layer 76 may be wrapped around biasing structure 74. The configuration of FIG. 5 is merely illustrative.

Figure 6:
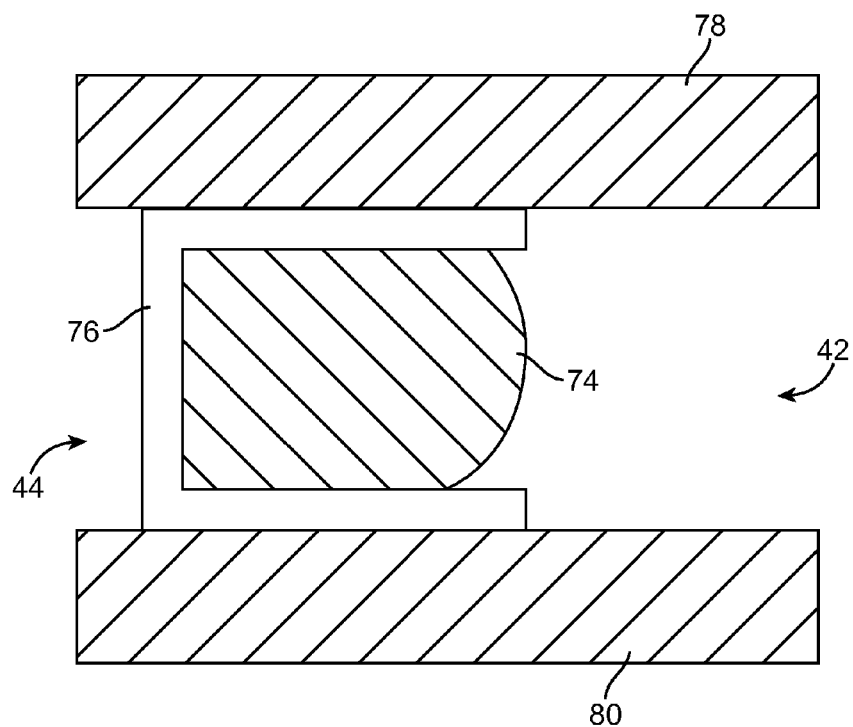
FIG. 6 is a cross-sectional side view of electronic device structures that have been sealed with a foam gasket wrapped with a C-shaped dust barrier layer in accordance with an embodiment of the present invention.

With an arrangement of the type shown in FIG. 5, layer 76 has an O-shaped cross-sectional shape that completely surrounds the periphery of biasing structure 74. FIG. 6 is a cross-sectional view of an illustrative dust sealing structure in a configuration in which dust barrier layer 76 extends only partly around the biasing structure. As shown in FIG. 6, dust sealing layer 76 may have a C-shaped cross-sectional shape that covers both the upper and lower surface of biasing structure 74. Other cross-sectional shapes may be used for dust sealing layers such as layer 76, if desired.

Figure 7:
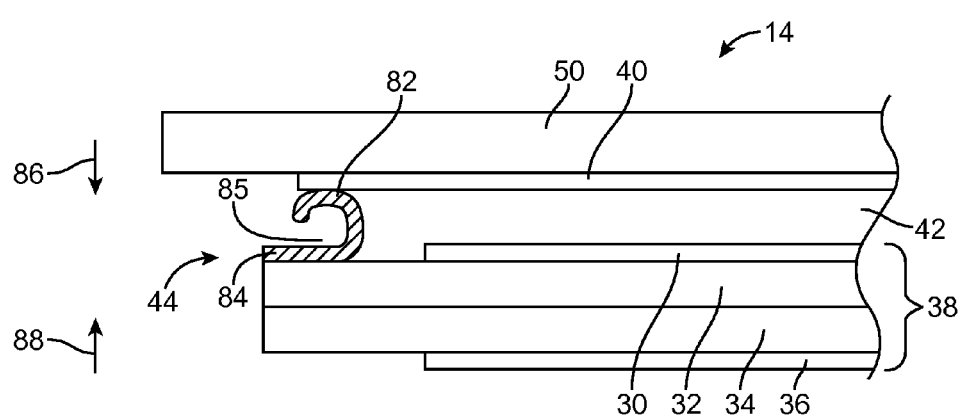
FIGS. 7, 8, and 9 are cross-sectional side views of display structures that have been sealed using illustrative elastomeric sealing structures in accordance with an embodiment of the present invention.

As shown in FIG. 7, dust sealing structure 44 may be formed from a compressible structure formed from an elastomeric material such as silicone or other elastomeric polymers (i.e., a solid non-foam polymer structure having a Shore A hardness of 15 to 70, less than 70, less than 50, less than 30, less than 20, more than 15, etc.). During assembly operations, layers such a display cover layer 50 and touch sensor layer 40 may be moved in direction 86 while display layers 38 such as upper polarizer layer 30, color filter layer 32, thin-film transistor layer 34, and lower polarizer 36 are moved in direction 88. When device structures are moved towards each other in this way, dust sealing structures 44 may be compressed between a layer such as touch sensor layer 40 and a layer such as color filter layer 32 (as an example). Portion 82 of dust sealing structure 44 may press upwards in direction 88 against touch sensor layer 40, whereas portion 84 of dust sealing structure 44 may press downwards in direction 86 against color filter layer 32, thereby sealing off air gap 42 of display 14 from dust and other contaminants in the external environment.

When compressed towards each other, portions 82 and 84 may move towards each other slightly, thereby narrowing the air gap formed by dust sealing air cavity 85. As shown in FIG. 7, air cavity 85 may be partly surrounded by the upper and lower portions of dust sealing structure 44 (i.e., the protruding portions of structure 44 that are formed from the solid elastomeric material may partly enclose air cavity 85).

Figure 8:
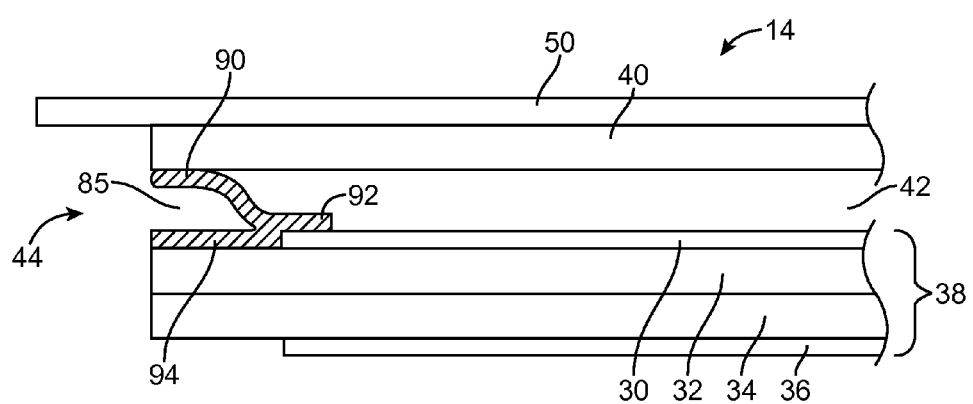

The cross-sectional shape of dust sealing structure 44 of FIG. 7 has an open P-shape (C-shape). Another cross-sectional shape that may be used by an elastomeric member for dust sealing structure 44 is shown in FIG. 8. As shown in the example of FIG. 8, dust sealing structure may have an upper portion such as portion 90 that bears against touch sensor layer 40 and may have lower portions such as lower portion 92 that bears against polarizer 30 and lower portion 94 that bears against a different layer in display layers 38 such as color filter layer 32. As with the example of FIG. 7, the material that forms dust sealing structure 44 of FIG. 8 may be a solid (non-foam) elastomeric polymer such as silicone and may be configured to partly surround air cavity 85.

Figure 9:
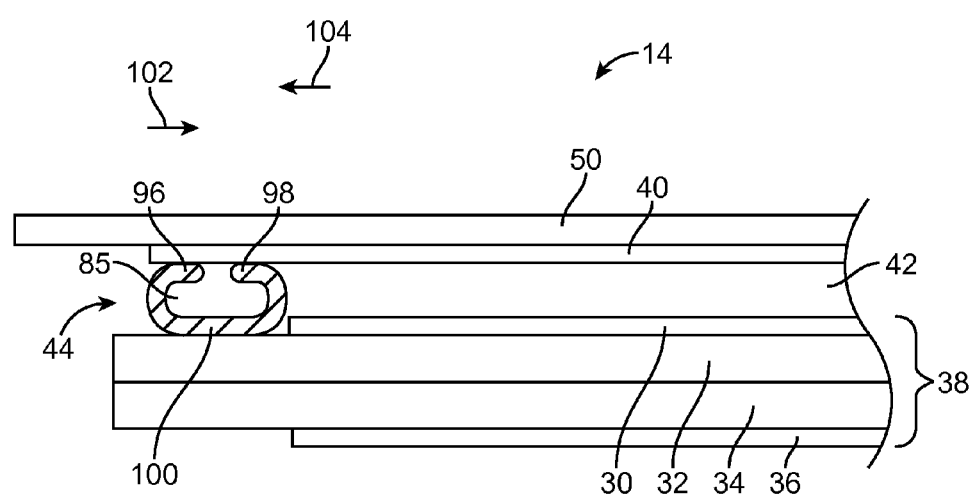

In the illustrative configuration of FIG. 9, elastomeric dust sealing structure 44 has been formed from portions of solid (non-foam) elastomeric material having a C-shaped (U-shaped) cross section with opposing upper portions such as portions 96 and 98 that bear against touch sensor layer 40 (as an example) and a lower portion such as portion 100 that bears against a display layer such as color filter layer 32 of display structures 38. As shown in FIG. 9, dust sealing structure 44 may partly surround air cavity 85. When display cover layer 50 and touch sensor layer 40 are pressed inwardly against display layers 38, sealing structure 44 may be compressed, thereby forming a dust seal for air gap 42. A wiping motion may be created in which protrusion 96 of structure 44 moves along the lower surface of touch sensor layer 40 in direction 102 while protrusion 98 of structure 44 moves along the lower surface of touch sensor layer 40 in opposing direction 104. Wiping motions such as these may help create a satisfactory dust seal without imposing excessive restoring force that might press apart structures such as touch sensor layer 40 and display layers 38. Protrusions such as protrusion 82 of dust sealing structure 44 of FIG. 7 and protrusion 90 of dust sealing structure 44 may also exhibit a wiping motion when the structures between which they are located are moved towards each other.

Figure 10:
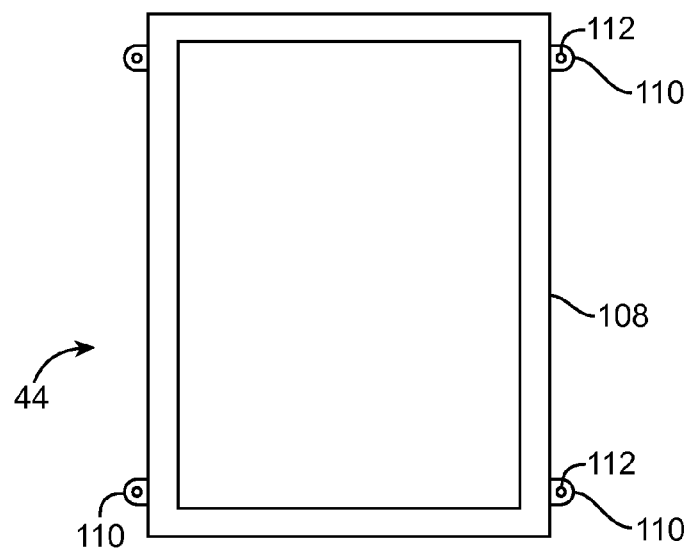
FIG. 10 is a top view of an illustrative dust sealing structure with positioning structures in accordance with an embodiment of the present invention.
Figure 11:
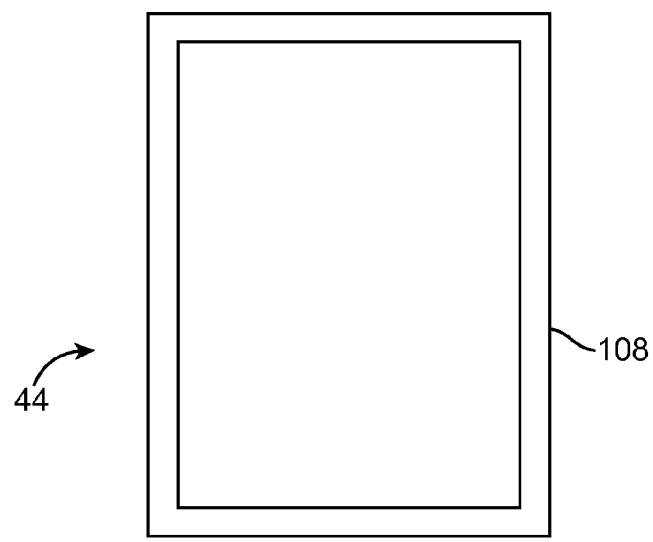
FIG. 11 is a top view of the illustrative dust sealing structure of FIG. 10 following removal of the positioning structures on the dust sealing structure in accordance with an embodiment of the present invention.

Elastomeric members such as the illustrative dust sealing structures 44 of FIGS. 7, 8, and 9 and other dust sealing structures 44 may have rectangular shapes when viewed in direction 106 of FIG. 2. A top view of an illustrative configuration that may be used for dust sealing structure 44 is shown in FIG. 10. As shown in FIG. 10, dust sealing structure 44 may have a main rectangular portion such as portion 108 having four edges. Each edge in portion 108 may have a cross-sectional shape such as one of the shapes of FIG. 7, 8, or 9 or other cross-sectional dust sealing structure shapes. If desired, integral positioning structures such as protrusions 110 may be formed on structure 108. Positioning structures 110 in the example of FIG. 10 have the shape of protrusions with openings such as openings 112. During assembly, an assembly tool (e.g., a fixture with a position that is adjusted by a computer-controlled positioner) may insert pins into openings 112 to control the position of dust sealing structure 44 relative to other structures in device 10.

If desired, a cutting tool, laser-based cutter, or other assembly equipment may be used in trimming off protrusions 110 following use of protrusions 110 in aligning dust sealing structure 44 relative to structures in device 10 such as display layers 38, touch sensor layer 40, and other structures.

Figure 12:
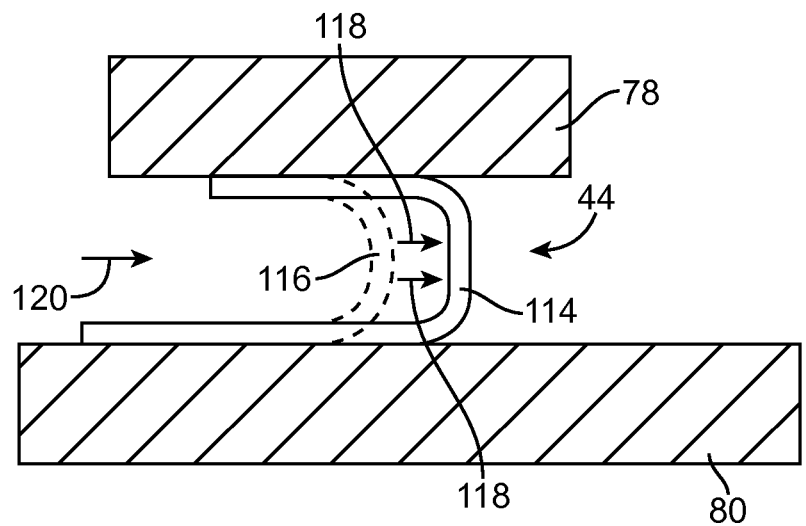
FIG. 12 is a side view of a portion of a dust sealing structure showing how the dust sealing structure may accommodate pressure fluctuations without breaking a seal in accordance with an embodiment of the present invention.

As shown in FIG. 12, an elastomeric sealing structure or other sealing structure that forms a bowed-out shape of the type shown in FIG. 12 may satisfactorily accommodate changes in air pressure on either side of the seal (e.g., when a display or device is flexed during use). Air pushing in direction 120 from the left side of dust sealing gasket 44 of FIG. 12 may press portion 114 of sealing structure 44 sufficiently to cause portion 114 to expand from position 116 outwards in directions 118. When the air pressure in direction 120 subsides, portion 114 of dust sealing structure 44 can return to position 116. Allowing dust sealing structure 44 to expand and contract in this way (with or without an accompanying wiping motion along the surfaces of structures 78 and/or 80) may help avoid damage to device 10 and/or dust sealing structures 44 during events that give rise to changes in internal air pressure adjacent to dust sealing structure 44.

Figure 13:
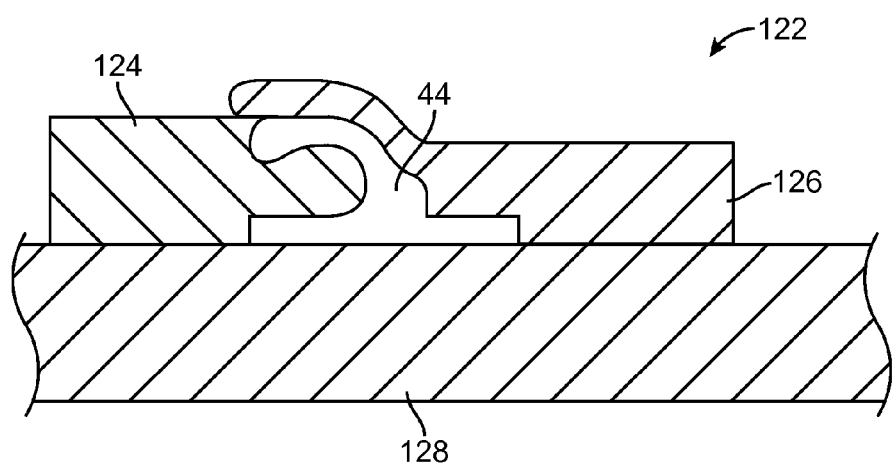
FIG. 13 is a cross-sectional side view of an illustrative injection molding tool being used to create a dust sealing structure in accordance with an embodiment of the present invention.

An elastomeric dust sealing structure such as structure 44 may be formed by polymer molding operations. As shown in FIG. 13, for example, a tool such as plastic molding tool 122 may have a number of portions such as portions 124, 126, and 128 that mate to form a cavity having a desired shape for structure 44. Injection molding operations or other plastic molding operations may be used in forming dust sealing structure 44 using equipment 122.

Figure 14:
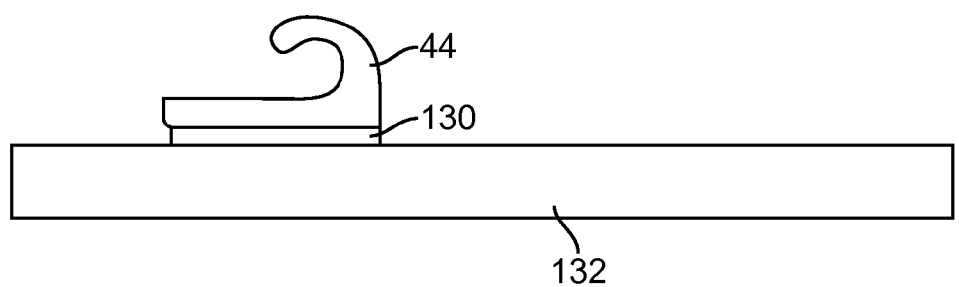
FIG. 14 is a cross-sectional side view of an illustrative dust sealing structure that is mounted on a release liner in accordance with an embodiment of the present invention.

FIG. 14 shows how dust sealing structures 44 may be temporarily mounted on a support structure such as release liner 132 using adhesive 130. When it is desired to mount dust sealing structure 44 in device 10, dust sealing structure 44 may be peeled away from release liner 132 (manually or using an assembly tool).

Figure 15:
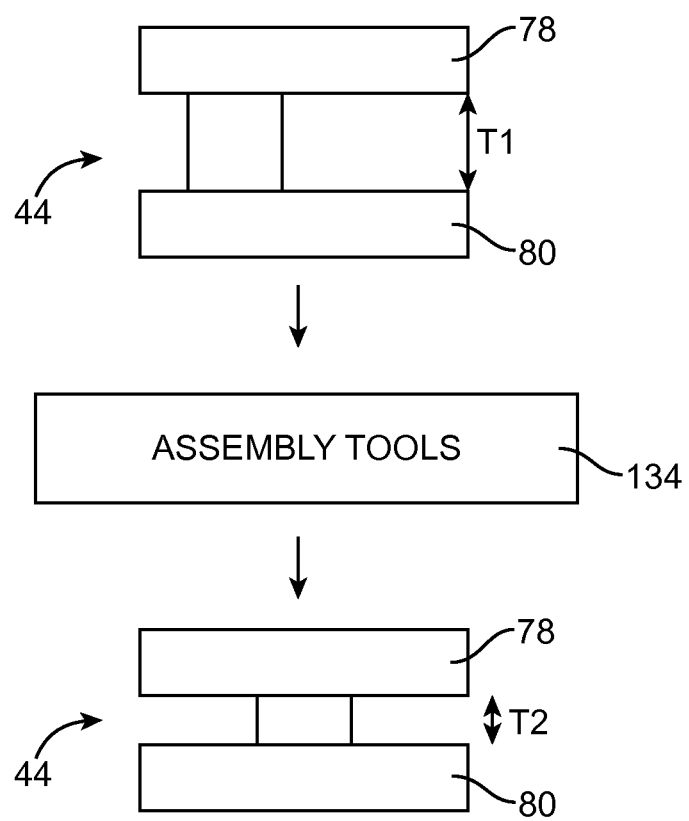
FIG. 15 is a diagram showing how a sealing structure may be formed by compressing a compressible member between opposing structures and processing the compressed member to set the member in the compressed state in accordance with an embodiment of the present invention.

If desired, dust sealing structure 44 may be formed from a compressible material such as a compression-set foam. The foam may initially have a thickness T1, as shown in FIG. 15. Following compression of the foam between structures 78 and 80 to reduce the thickness of dust sealing structures 44 to thickness T2 (i.e., a thickness that is less than thickness T1), processing operations may be performed by assembly tools 134 to set the foam in its compressed state. As an example, the compressed foam may be subjected to heat (thermal energy) and/or ultrasonic signals (acoustic energy) in the presence of a humid ambient environment (e.g., an environment with water vapor and/or chemicals to encourage the foam to set and remain at or near its compressed thickness). By processing the compressed foam in this way, the foam may be maintained at its compressed thickness T2 and the restoring force that is exhibited by the compressed foam may be reduced significantly.

Figure 16:
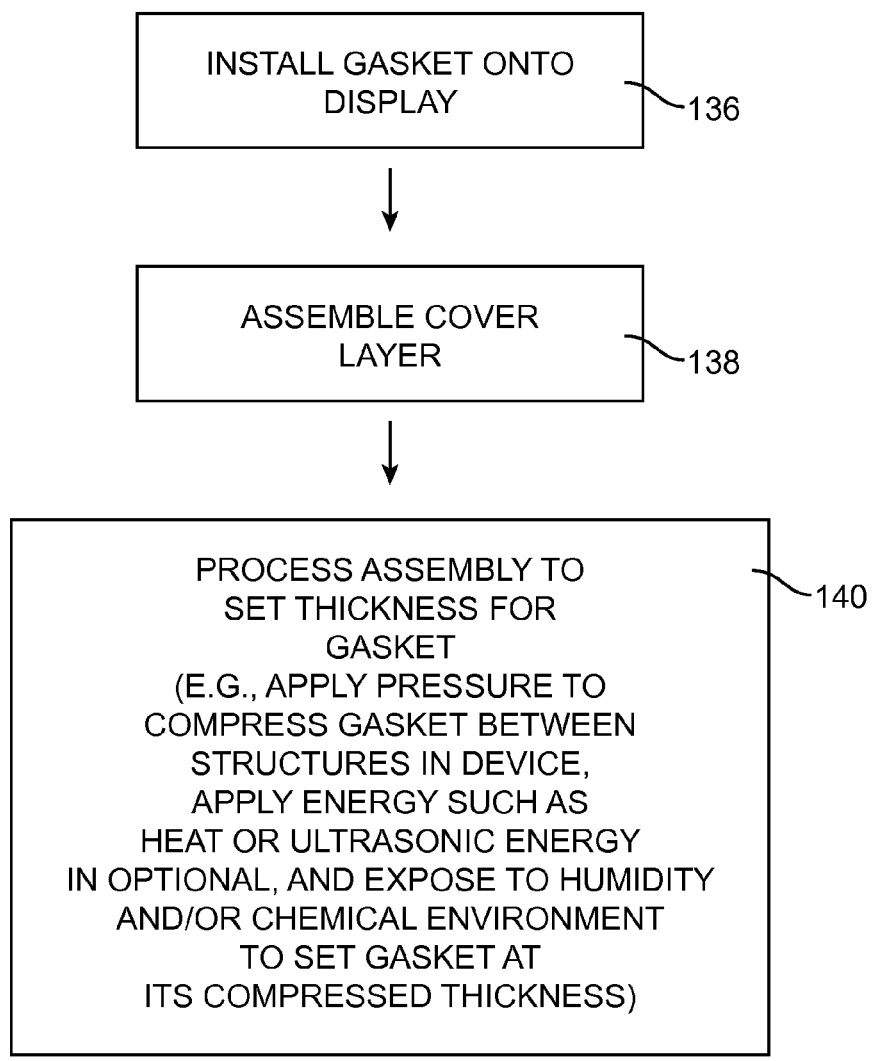
FIG. 16 is a flow chart of illustrative steps involved in forming a compressed dust sealing structure using a compressible member of the type shown in FIG. 15 in accordance with an embodiment of the present invention.

Illustrative steps involved in forming an electronic device having a dust sealing member formed from a material such as a compression-set foam are shown in FIG. 16.

At step 136, a compressible polymer foam material that is configured to accept a set when processed may be installed in a portion of device 10. For example, a compression-set foam member having the shape of a rectangular ring or other suitable shape may be installed along the four peripheral edges of a rectangular display (e.g., display layers 38). The foam member may, as an example, be placed on top of a layer such as color filter layer 32 or thin-film-transistor layer 34. An optional layer of adhesive (e.g., pressure sensitive adhesive) may be used in attaching the foam member to display layers 38.

At step 138, additional components of device 10 may be assembled. As an example, display layers 38 may be mounted in housing 12 and additional layers such as display cover layer 50 and touch sensor layer 40 may be mounted within housing 12. When mounting display cover layer 50 and touch sensor layer 40 within device 10, the undersides of one or both of these layers may press against the upper surface of the compressible foam member. For example, the lower surface of touch sensor layer 40 and/or the inner surface of display cover layer 50 may press against the compressible foam member. As described in connection with FIG. 15, this may compress the foam member until its thickness is reduced from initial thickness T1 to reduced thickness T2, thereby ensuring a satisfactory dust seal for device 10. A dust seal that is formed in this way may be used to seal air gap 42 against dust from other portions of device 10 such as cavity 46 (FIG. 2). If desired, an optional layer of adhesive such as a layer of pressure sensitive adhesive may be used to help secure the foam member to the touch sensor layer and/or the display cover layer.

At step 140, the assembled device structures may be processed using assembly equipment 134 of FIG. 15. Assembly equipment 134 may include equipment for applying pressure (e.g., computer-controlled positioners for compressing structures in device 10 together to compress the foam), equipment for applying energy in the form of heat (e.g., an oven, heat lamp, laser, hot bar, or other heat source), equipment for applying energy in the form of acoustic signals such as an ultrasonic signal generator that applies ultrasonic acoustic signals, equipment for exposing the device structures to an atmosphere that contains an elevated amount of water vapor (e.g., as part of a humid air environment) or other liquid or gaseous chemicals, and other tools for processing and treating the structures of device 10 and the compressed foam. Applying heat in the range of 50° C. to 80° C. may be helpful in setting the foam in its compressed state. Restricting applied heat levels to less than about 60° C. may be helpful in scenarios in which device 10 includes sensitive components such as magnets that might demagnetize with prolonged exposure to temperatures above 60° C. (as an example).

When processed during the operations of step 140, the energy and/or chemicals that are applied to the compressed foam cause the compressed foam to become fixed in its compressed state, thereby relieving the structures of device 10 from the restoring force that would otherwise be generated by the compressed foam attempting to regain its original uncompressed shape. Setting the compressed foam in its compressed state may therefore cause the compressed foam to form a low-force dust seal for device 10.

If desired, a low-force dust seal may be formed by applying the dust seal material to the structures of device 10 in liquid form followed by curing operations to solidify the liquid material. For satisfactory processing, it may be desirable to use a relatively cohesive material such as a two-part silicon adhesive with a 5-30 minute cure time in forming the low-force dust seal. This material (e.g., material 44M of FIG. 17) may be placed between opposing device structures such as structures 78 and 80 of FIG. 17. Structures 78 and 80 of FIG. 17 may include a display cover layer, a touch sensor layer, display layers such as polarizer layers, color filter layers, thin-film transistor layers, backlight structures, housing structures such as housing walls and internal planar mid-plate structures, other structures in device 10 and combinations of these structures. By using a cohesive material, undesirable wicking effects which might result in damage to expensive display structures can be avoided. Cohesive materials such as material 44M may also make it possible to rework or repair device 10.

Figure 17:
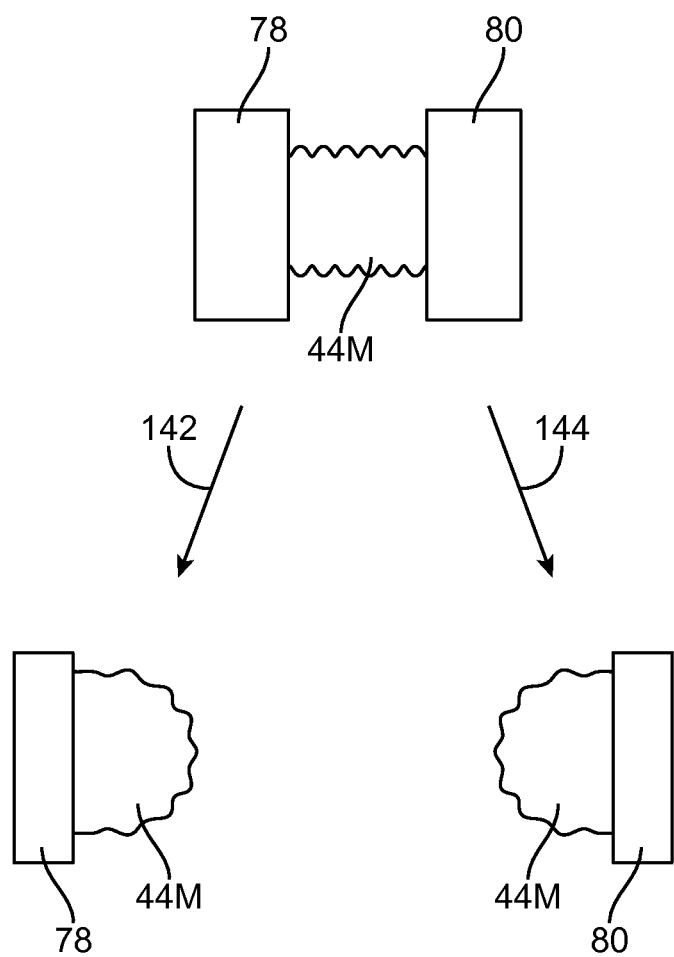
FIG. 17 is a diagram showing how a dust sealing structure material may be formed from a highly cohesive material in accordance with an embodiment of the present invention.

As shown in FIG. 17, when a sufficiently cohesive material is used such as material 44M, material 44M will tend to stick to itself and either structure 78 or 80 when structures 78 and 80 are pulled apart. For example, in some situations, separation of structures 78 and 80 will result in material 44M becoming stuck to structure 78, as shown by arrow 142, whereas in other situations, separation of structures 78 and 80 will result in material 44M becoming stuck to structures 80.

Figure 18:
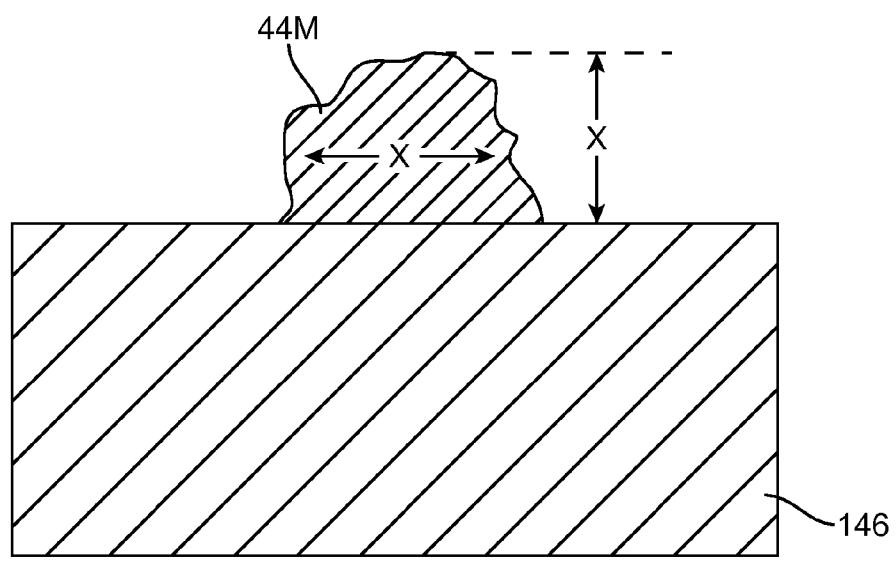
FIG. 18 is a side view of an illustrative dust sealing structure material that is sufficiently viscous to form a bead of material on a surface in accordance with an embodiment of the present invention.

In addition to being formed from a highly cohesive material, it may be desirable for material 44M to be sufficiently viscous to form a shape of the type shown in FIG. 18 in which material 44M maintains a height that is equal to or greater than its width when placed on a support structure (i.e., support 146 of FIG. 18). When formed from a material that sustains an aspect ratio of greater than or equal to 1:1 (width X and height X being equal), a dust seal structure may be assembled without wicking or leaking into undesired portions of device 10. In an illustrative configuration, the value of X may be about 1 mm for sealing an air gap such as air gap 42 with a size of about 0.3 to 0.7 mm.

Material 44M may also be formed from a low durometer material (i.e., a material that is sufficiently soft that it does not impose strain on display layers 38 and other components of display 14 that would lead to light leakage). An example of a soft material that may be used for material 44M is a material that has Shore A hardness of 15 to 70 (or less than 70, less than 50, less than 30, less than 20, more than 15, etc.).

Using a two-part mixture for material 44M or other suitable formulation, material 44M may be configured to cure at a relatively low temperature (e.g., room temperature or a slightly elevated temperature). Material 44M preferably exhibits low outgassing (e.g., sufficiently low outgassing to avoid creating obstructions that lead to visible artifacts during the operation of display 14). If desired, absorbing structures may be incorporated into display 14 to reduce or eliminate fogging from outgassing material 44M.

Figure 19:
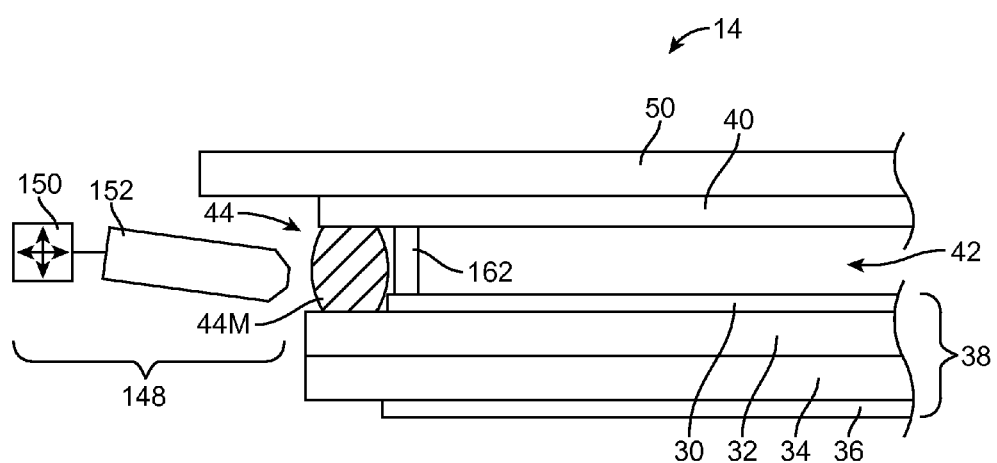
FIG. 19 is a cross-sectional side view of a portion of an electronic device showing how a dust sealing structure may be formed by dispensing a liquid sealing structure material from a nozzle in accordance with an embodiment of the present invention.

Equipment of the type that may be used to dispense material 44M in liquid form is shown in FIG. 19. As shown in FIG. 19, liquid dust sealant dispensing equipment 148 may include a computer-controlled positioner such as computer-controlled positioner 150 and a liquid sealant dispensing nozzle such as nozzle 152. During operation, computer-controlled positioner 150 may be used to run nozzle 152 along the edges of display 14, thereby dispensing liquid material 44M between display layers such as touch sensor layer 40 and color filter layer 32 or other layers (e.g., cover layer 50, layers among display structures 38, housing structures, etc.). A spacer structure such as spacer 162 of FIG. 19 may be used to ensure that the thickness of air gap 42 (i.e., the separation between touch sensor layer 40 and display layers 38) is accurately maintained at a desired value during curing operations. Following curing, material 44M may form low-force dust sealing structure 44 of FIG. 19.

Figure 20:
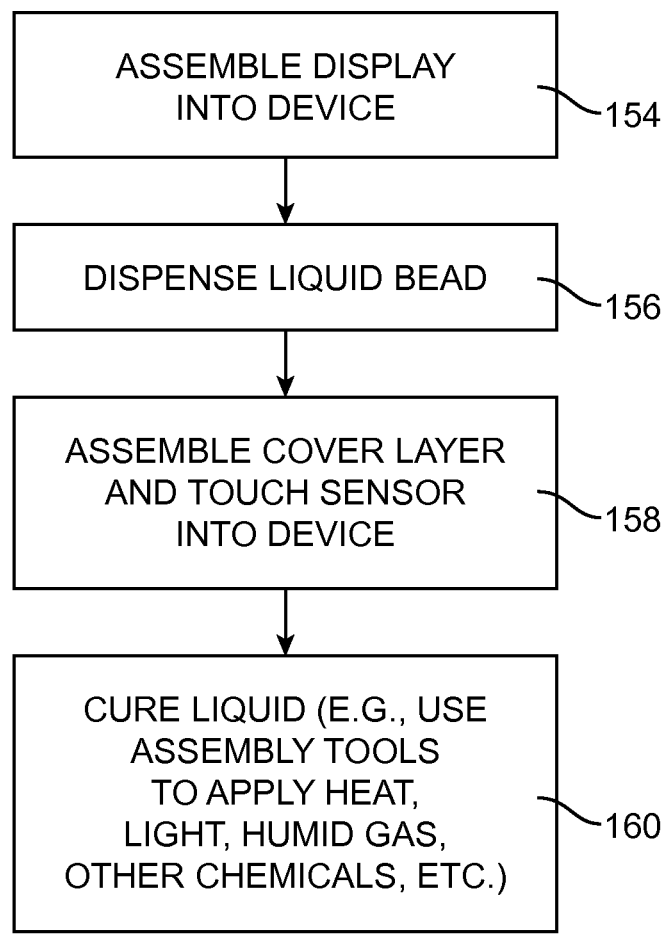
FIG. 20 is a flow chart of illustrative steps involved in forming a sealing structure using a curable liquid sealing structure material in accordance with an embodiment of the present invention.

Illustrative steps involved in forming low-force dust sealing structures using liquid materials such as material 44M are shown in FIG. 20.

At step 154, display components such as backlight structures 20 and display layers 38 may be installed within housing 12 of device 10 (e.g., by mounting these structures on an internal support structures such as internal housing structure 60 of FIG. 2).

At step 156, a liquid bead of material 44M may be dispensed to form a liquid ring of material that runs around the rectangular periphery of display layers 38 in display 14. As an example, equipment 148 of FIG. 19 may be used to dispense a bead of material along the edge of display layers (e.g., a bead of material that runs along the rectangular periphery of color filter layer 32 or other suitable display layers). If desired, the liquid bead of material may be dispensed on display layers 38 prior to assembly of layers 38 into housing 12.

At step 158, additional device structures may be attached to the display layers. As an example, display cover layer 50 and touch sensor layer 40 may be lowered on top of display layers 38, thereby compressing liquid material 44M between opposing structures such as touch sensor layer 40 and color filter layer 32. Because material 44M is liquid, no significant restoring force will generally be created by material 44M following compression.

At step 160, assembly tools such as assembly tools 134 of FIG. 15 may be used in curing material 44M to form dust sealing structure 44. In curing material 44M, heat may be applied (e.g., heat that elevates the temperature of material 44M above room temperature) or material 44M may be cured by waiting for a specified amount of time at room temperature. The environment to which material 44M is exposed may, if desired, be adjusted to promote curing. As an example, material 44M may be exposed to an atmosphere with a humidity that is elevated with respect to the ambient atmosphere, an environment that contains liquid and/or gaseous chemicals that promote curing, etc.

Once material 44M has cured, dust sealing structure 44 may be used to prevent dust and other environmental contaminants from entering sensitive portions of device 10 such as air gap 42 within display 14. Because liquid material 44M was used in forming sealing structure 44, the structures that form sealing structure 44 will not generally resist compression during the assembly operations of step 158. As a result, following curing operations at step 160, dust sealing structure 44 will not produce forces that tend to disassemble the sealed structures in device 10.

Figure 21:
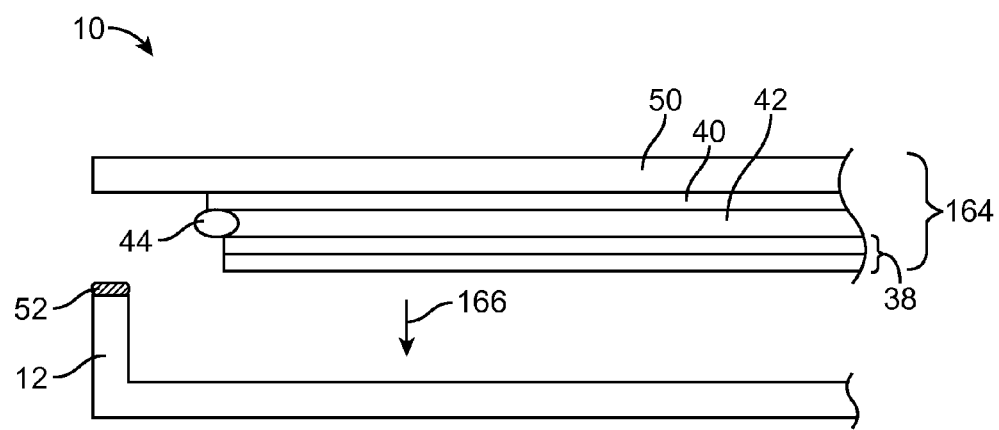
FIG. 21 is a cross-sectional side view of display structures that have been sealed using a sealing structure before being mounted into an electronic device enclosure in accordance with an embodiment of the present invention.

FIG. 21 shows how dust sealing structure 44 may be formed as part of a display assembly such as display assembly 164. Dust sealing structure 44 may be formed using a tape-based sealing structure, using an elastomeric sealing structure, using a compression-set foam structure, or using a cured liquid structure (as examples). Assembly 164 may be formed by assembling the components of assembly 164 such as display cover layer, touch sensor layer 40, display layers 38, and dust sealing structure 44 prior to mounting assembly 164 in device housing 12 in direction 166.

Figure 22:
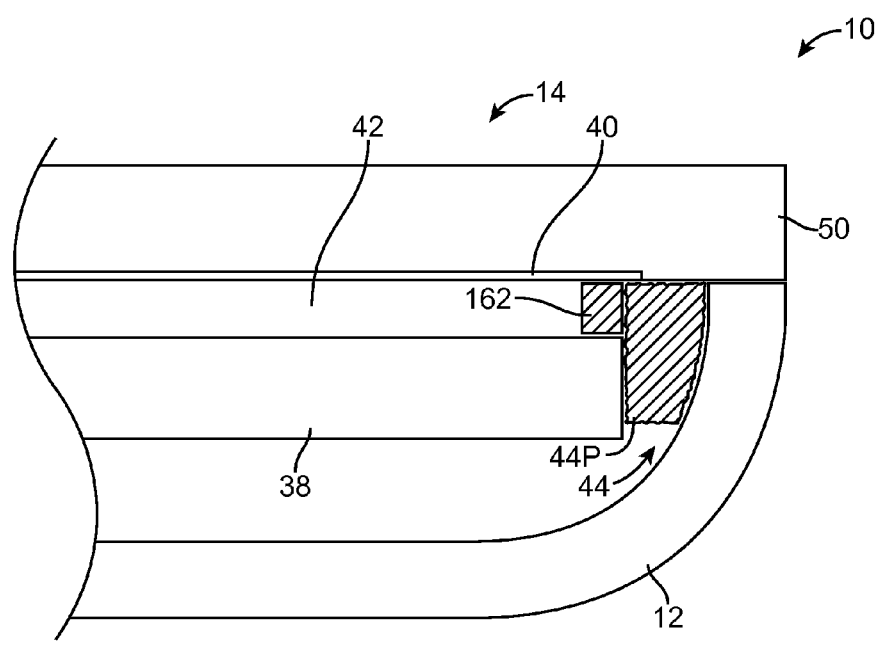
FIG. 22 is a cross-sectional side view of an illustrative electronic device in which a curable liquid potting material has been used to form a dust sealing structure between a display and other structures in accordance with an embodiment of the present invention.

As shown in FIG. 22, dust sealing structures such as dust sealing structure 44 may be formed by injecting potting compound 44P into device 10. Potting compound 44P may be formed from a curable liquid such as liquid material 44M or other suitable material that can be cured (e.g., at room temperature, using an elevated temperature, under ultraviolet light exposure, etc.). Potting compound 44P may be injected into device 10 using equipment such as equipment 148 of FIG. 19. Assembly tools such as tools 134 of FIG. 15 may be used in curing potting compound 44P following injection into device 10. A spacer such as spacer 162 may be used to help regulate the separation between touch sensor layer 40 and display layers 38 (i.e., the size of air gap 42). Following curing, material 44P may form a solid dust sealing structure such as dust sealing structure 44. In the example of FIG. 22, dust sealing structure 44 has been formed between opposing structures such as display cover layer 50 (and touch sensor layer 40), display layers 38, and housing 12. This is merely illustrative. Seals such as dust seal 44 of FIG. 22 may be formed between any two or more structures in device 10.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device comprising:
   a display layer;
   a structure that is separated from the display layer by an air gap; and
   a tape-based dust seal that is configured to span the display layer and the structure to seal the air gap against dust intrusion, wherein the display layer comprises a color filter layer, and wherein the tape-based dust seal is attached to the color filter layer.

2. The electronic device defined in claim 1 wherein the structure comprises a housing structure.

3. The electronic device defined in claim 2 wherein the tape-based dust seal comprises a strip of tape having one portion that is attached to the housing structure and another portion that is attached to the display layer.

4. The electronic device defined in claim 3 wherein the strip of tape has an S-shaped cross-sectional shape.

5. The electronic device defined in claim 1 wherein the tape-based dust seal comprises a strip of tape with a C-shaped cross-sectional shape.

6. The electronic device defined in claim 1 wherein the structure comprises a display cover layer.

7. The electronic device defined in claim 6 wherein the tape-based dust seal comprises a strip of tape having one portion that is attached to the color filter layer and another portion that is attached to the display cover layer.

8. An electronic device, comprising:
   a display layer;
   a structure that is separated from the display layer by an air gap; and an elongated dust seal structure that seals the air gap against dust infiltration, wherein the elongated dust seal structure comprises a foam member surrounded at least partially by a dust barrier layer that is interposed between the foam member and the display layer.

9. The electronic device defined in claim 8 wherein the structure comprises a touch sensor layer and wherein the dust barrier layer comprises a layer of fabric.

10. The electronic device defined in claim 8 wherein the dust barrier layer comprises a layer selected from the group consisting of: a plastic layer, a metal layer, and a resolidified layer of melted foam.

11. The electronic device defined in claim 8 wherein the display layer comprises a color filter layer.

12. The electronic device defined in claim 11 wherein the structure comprises a touch sensor layer.

13. The electronic device defined in claim 11 wherein the display layer comprises a display cover layer.

14. The electronic device defined in claim 8 wherein the dust barrier layer has a C-shaped cross-sectional shape.

15. The electronic device defined in claim 8 wherein the dust barrier layer has an O-shaped cross-sectional shape.

16. An electronic device, comprising:
a display layer;
a structure that is separated from the display layer by an air gap; and
an elastomeric dust sealing structure that seals the air gap against dust, wherein the elastomeric air sealing structure is formed from a solid elastomeric material that is configured to at least partly surround an air cavity that is at least partially interposed between a portion of the elastomeric dust sealing structure and the display layer.

17. The electronic device defined in claim 16 wherein the solid elastomeric material comprises silicone.

18. The electronic device defined in claim 16 wherein the solid elastomeric material has a Shore A hardness of less than 70.

19. The electronic device defined in claim 16 wherein the elastomeric dust sealing structure has a C-shaped cross-sectional shape having a first portion that contacts the display layer and having a second portion that contacts the structure.

20. The electronic device defined in claim 16 wherein the elastomeric dust sealing structure has a rectangular ring shape.

21. The electronic device defined in claim 20 wherein the display layer comprises a color filter layer.

22. The electronic device defined in claim 21 wherein the structure comprises a touch sensor layer.

23. The electronic device defined in claim 16 wherein the display layer comprises a color filter layer having a rectangular periphery and wherein the elastomeric dust sealing structure has a rectangular ring shape that runs along the rectangular periphery of the color filter layer.

24. The electronic device defined in claim 16 wherein the display layer comprises a color filter layer, the electronic device further comprising a polarizer layer on the color filter layer, wherein the elastomeric dust sealing structure has a first portion that contacts the color filter layer, a second portion that contacts the polarizer layer, and a third portion that contacts the structure.

25. The electronic device defined in claim 24 wherein the structure comprises a touch sensor layer.

26. The electronic device defined in claim 16 wherein the structure comprises a touch sensor layer and wherein the elastomeric sealing structure has a C-shaped cross section with opposing portions that bear against the touch sensor layer.

27. The electronic device defined in claim 16 wherein the elastomeric dust sealing structure has a rectangular ring shape that runs along a rectangular periphery of the display layer and wherein the elastomeric dust sealing structure has protruding alignment structures with holes.

* * * * *